(12) United States Patent
Cheng

(10) Patent No.: US 6,382,843 B1
(45) Date of Patent: May 7, 2002

(54) CONVERTIBLE FIBER-OPTIC PLUG

(76) Inventor: Yu-Feng Cheng, No. 7, Fuhsing St., Tucheng Ind. Dist., Tucheng City, Taipei Hsien (TW)

( * ) Notice: Subject to any disclaimer, the term of this patent is extended or adjusted under 35 U.S.C. 154(b) by 0 days.

(21) Appl. No.: 09/716,981

(22) Filed: Nov. 20, 2000

(51) Int. Cl.[7] .................................................. G02B 6/36
(52) U.S. Cl. ........................................... 385/78; 385/60
(58) Field of Search ............................. 385/89, 92, 78, 385/76–84, 139, 60

(56) References Cited

U.S. PATENT DOCUMENTS

| | | | |
|---|---|---|---|
| 4,579,418 A | * | 4/1986 | Parchet et al. ............. 350/96.2 |
| 5,293,582 A | * | 3/1994 | Beard et al. .................. 385/78 |
| 5,953,475 A | * | 9/1999 | Bier et al. ..................... 385/76 |
| 5,963,690 A | * | 10/1999 | Cheng .......................... 385/76 |

* cited by examiner

*Primary Examiner*—John D. Lee
*Assistant Examiner*—Jerry T Rahll
(74) *Attorney, Agent, or Firm*—Jackson Walker L.L.P.

(57) ABSTRACT

A convertible fiber optic plug includes a hollow body with a filament movable with respect to the body and a rotation portion convertible relative to the body and provided with a first head and a second head. Each of the first head and the second head is selectively connected to the filament, such that the plug is able to adapt to different acoustic devices.

15 Claims, 5 Drawing Sheets

CONVERTIBLE FIBER-OPTIC PLUG

BACKGROUND OF THE INVENTION

1. Field of the Invention

The present invention relates to a fiber-optic plug, and more particularly to a fiber optic plug that has two different heads securely mounted on a rotation portion convertible with respect to a body of the plug, such that the plug is able to adapt to different acoustic devices.

2. Description of Related Art

Fiber optic is widely used in transporting signals for its low distortion and high transporting speed. Because of the features, fiber optic is particularly popular in digitized acoustic devices such as DVD, CD, MD and Digital Decoder. However, different plugs are required in connecting digitized devices in order to transmit signals. In general, there are two different types of plugs used in the market, which is the first type and the second type plugs.

With reference to FIG. 6, the first type plug (60) defines therein a socket (61). When the first type plug (60) is to be connected with a receiving socket (not shown or numbered) of a digitized device, the first type plug (60) needs to incorporate with a connector (62) with a second type plug (621) which is mated with the receiving socket of the digitized device. That is, the user needs to prepare at least two sets of different plugs in case there is a need when connecting devices. Because no matter the first type plug (60) or the second type plug (62), they are loose with each other, it is quite easy for the user to loose them. Furthermore, the user will have to buy an extra connector in order to complete the connection between devices, which is quite inconvenient for the user.

To overcome the shortcomings, the present invention tends to provide an improved fiber-optic plug to mitigate and obviate the aforementioned problems.

SUMMARY OF THE INVENTION

The primary objective of the invention is to provide an improved fiber-optic plug having a body with two different heads oppositely formed on the body and a rotation portion with two extensions in which the body is convertible seated, such that the user is able to change the head as required.

Other objects, advantages and novel features of the invention will become more apparent from the following detailed description when taken in conjunction with the accompanying drawings.

DETAILED DESCRIPTION OF PREFERRED EMBODIMENT

Figure 1:
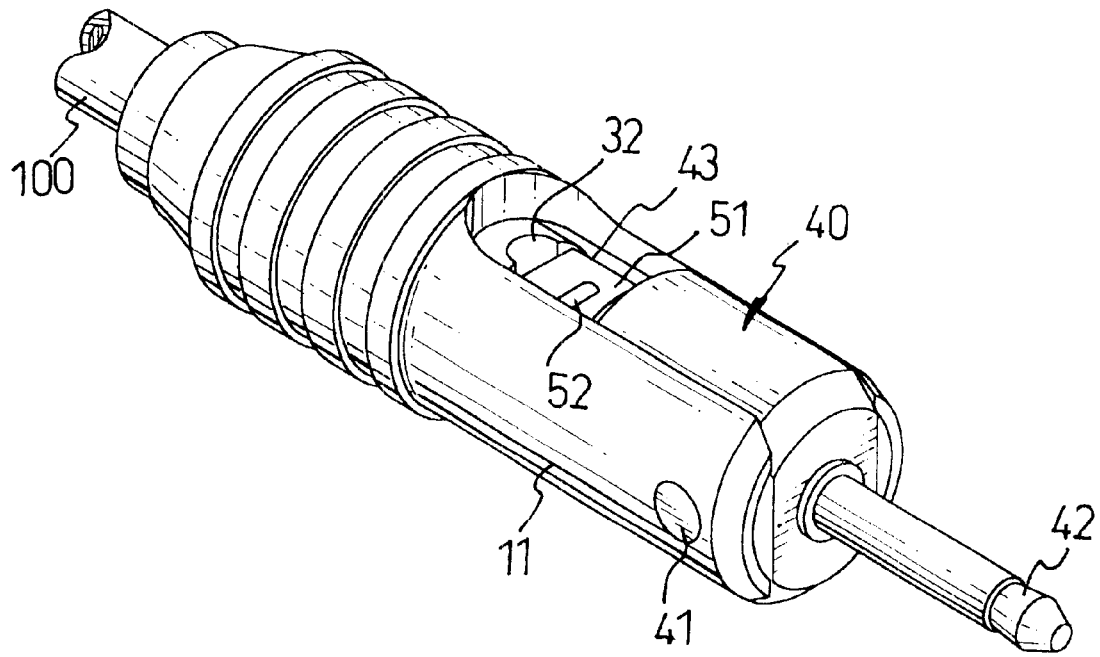
FIG. 1 is a perspective view of the fiber-optic plug constructed in accordance with the present invention.
Figure 2:
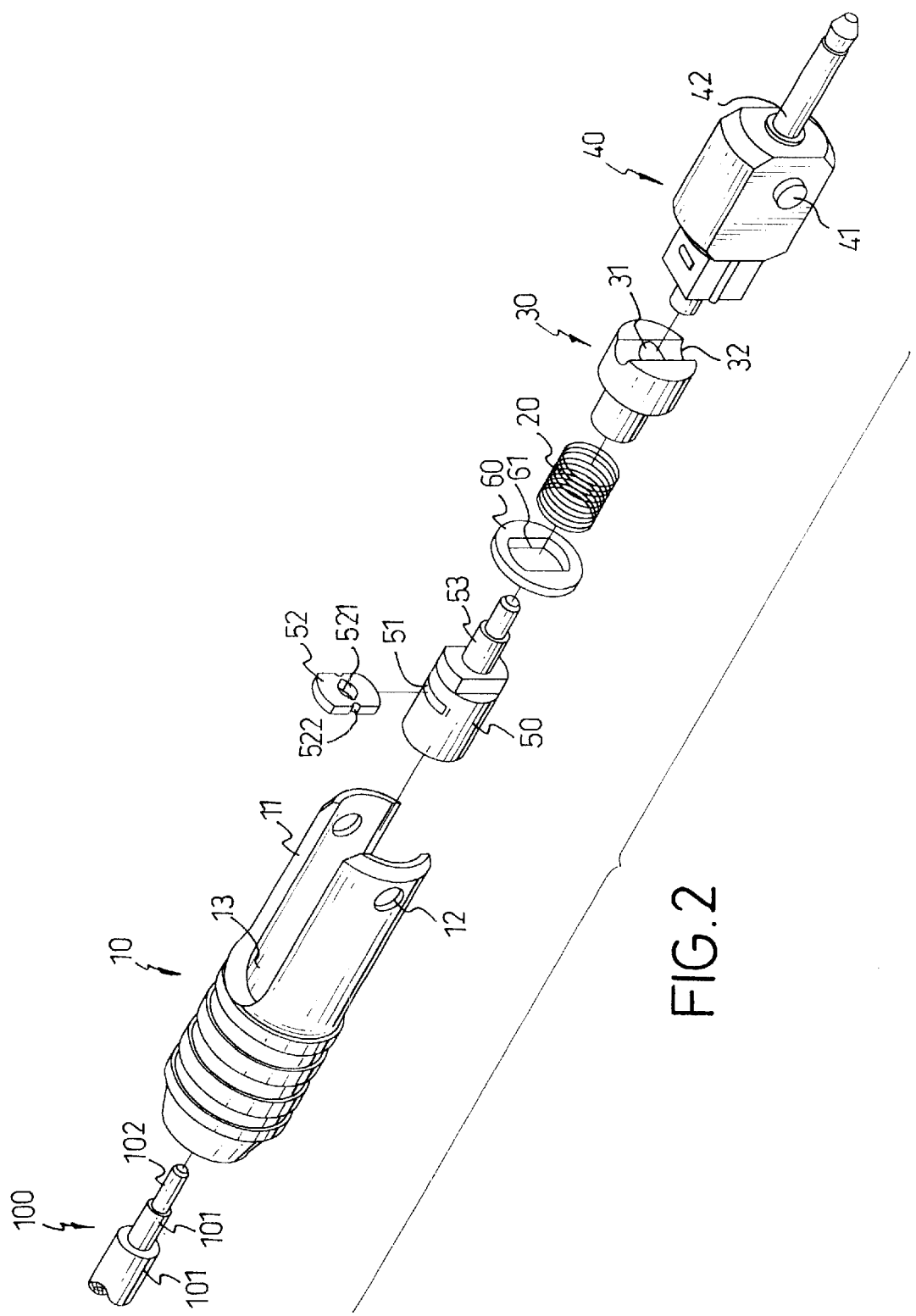
FIG. 2 is an exploded perspective view of the fiber-optic plug of FIG. 1.

With reference to FIGS. 1 and 2, the fiber-optic plug in accordance with the present invention has a body (10), a resilient member (20), an engaging member (30), a rotation portion (40), a connection seat (50) and a stop (60).

Figure 3A:
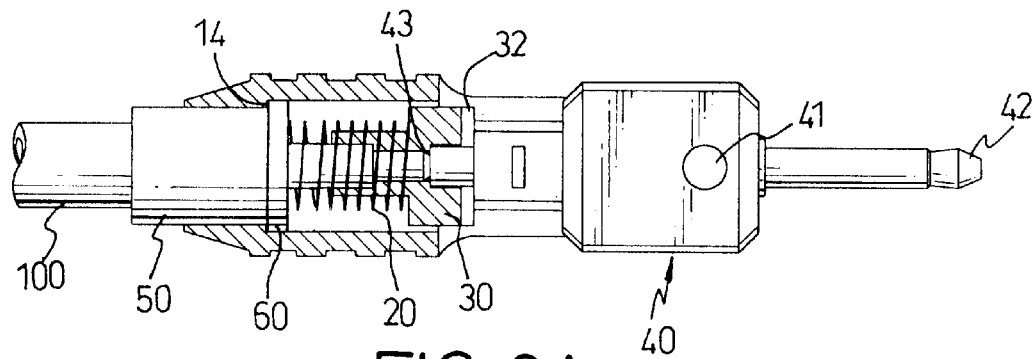
FIGS. 3A~3C are operational side plan views showing the rotation of the rotation portion with respect to the body of the plug of the invention.

The body (10) is hollow and is able to connect securely a fiber-optic (100) formed with a filament (102) which has insulating layers (101) of different diameters and the insulating layers (101) are mounted outside the filament (102). The body (10) has a pair of extensions (11) extending out in parallel, a gap (13) defined between the pair of extensions (11) and a shoulder (14) formed in an inner wall defining the hollow body (10) (as shown in FIG. 3A). Each of the extensions (11) has a through hole (12) defined to align with each other.

Figure 4:
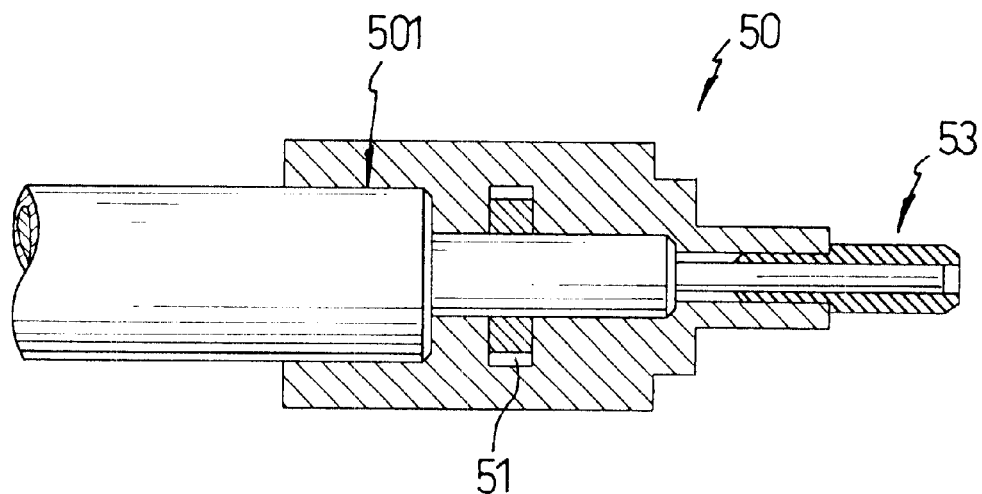
FIG. 4 is a cross section of the connection seat of the invention.

The connection seat (50) is a step-like cylinder and has a centrally defined path (501) (as shown in FIG. 4) which is mated with the fiber optic (100), a hole (51) laterally defined to communicate with the path (501) and a terminal (53) formed on a front end of the connection seat (50).

A clamping plate (52) corresponds to the hole (51) so as to be inserted into the hole (51) and has a deformed opening (521) and two cutouts (522) defined in two opposite sides of the clamping plate (52).

The stop (60) has a through opening (61) defined to allow the extension of the front portion of the body (10).

The resilient member (20) is mounted around the front portion of the body (10) and is stopped by the stop (60).

Figure 5:
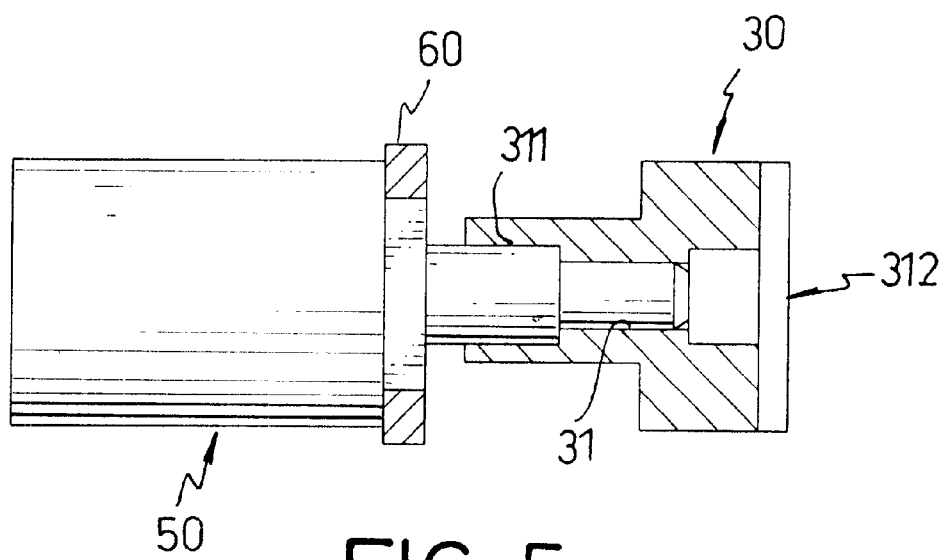
FIG. 5 is a cross section of the engaging member of the invention.
Figure 6:
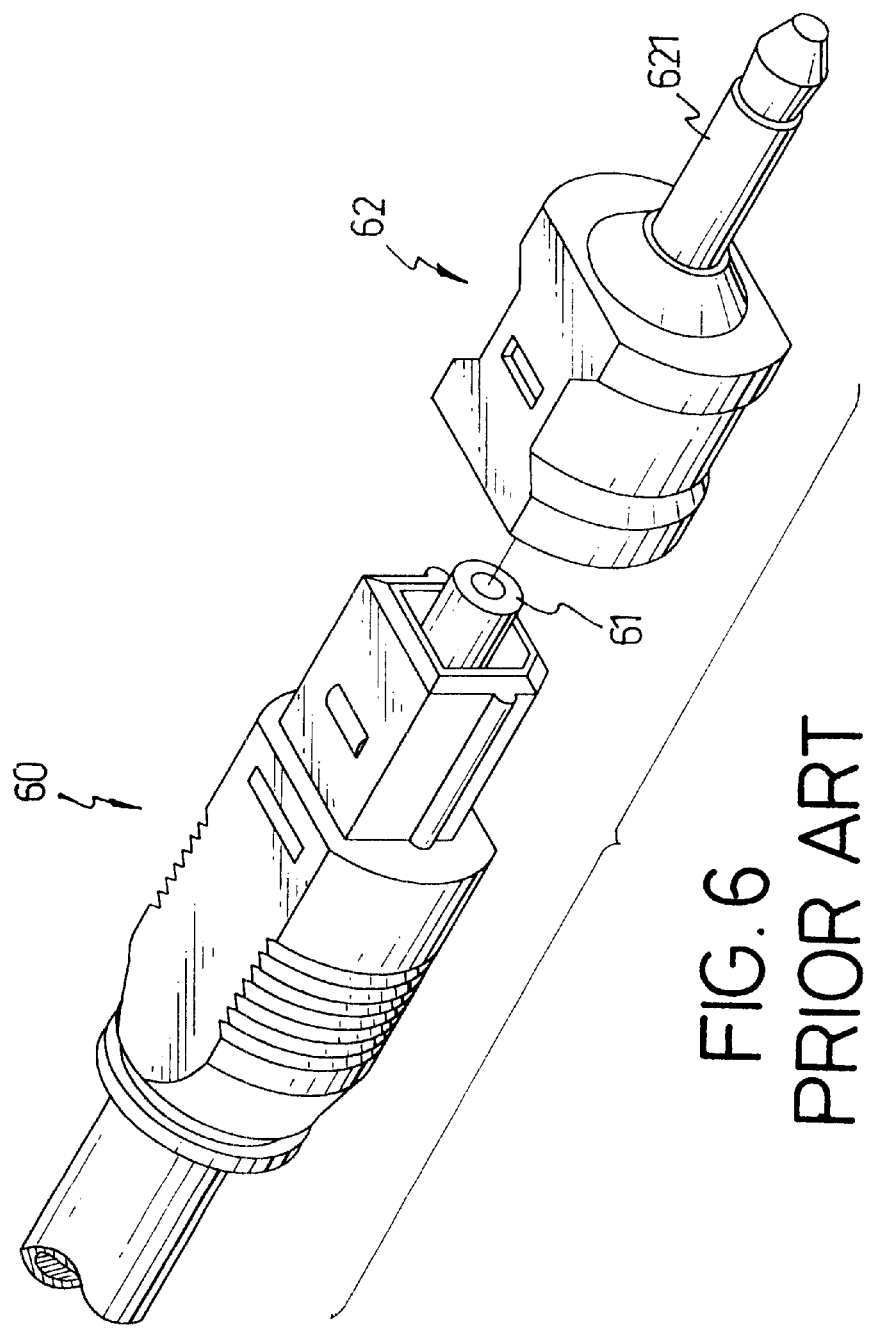
FIG. 6 is a conventional fiber-optic plug together with a connector.

The engaging member (30) has a central passage (31) defined to allow the insertion of the terminal (53) of the body (10), an enlarged opening (311) (as shown in FIG. 5) communicating with the central passage (31) and a recess (32) defined to communicate with the central passage (31).

The rotation portion (40) has a pair of oppositely formed protrusions (41) each corresponding to one of the through holes (12) of the extensions (11) of the body (10) and a first head (42) and a second head (43) respectively corresponding to the central passage (31) of the engaging member (30).

When in assembly, as shown in FIG. 3A, connection seat (50) is inserted into the hollow body (10) from the end opposite to that of the extensions (11). Then, the fiber optic (100) is inserted into the centrally defined path (501) of the connection seat (50) and the filament (102) is clamped by the deformed opening (521) of the clamping plate (52) which is inserted into the hole (51) of the connection seat (50). Because the terminal (53) of the connection seat (50) is made of a built-in filament, such that the insertion of the filament (102) of the fiber optic (100) into the path (501) is able to have a connection with the terminal (53) to transmit the signal out from the terminal (53). In an alternative preferred embodiment of the terminal (53), the centrally defined path (501) extends through the connection seat (50). That is, before the clamping plate (52) secures the filament (102) of the fiber optic (100), the filament (102) is flush with the free end of the terminal (53). Thereafter, the stop (60) is inserted into the gap (13) between the extensions (11) to abut the front portion of the connection seat (50) and allows the extension of the terminal (53) into the through opening (61). When the above assembly procedure is finished, the resilient member (20) is mounted around the terminal (53) before the terminal (53) has an interference fit with the central passage (31) of the engaging member (30).

After this is done, the terminal (53) together with the engaging member (30) is movable with respect to the body (10) due to the resilience of the resilient member (20). In the end, the rotation portion (40) is mounted between the two extensions (11) by inserting the pair of protrusions (41) into each of the corresponding through holes (12). After the rotation portion (40) is mounted between the extensions (11)

of the body (10), the second head (43) of the rotation portion (40) is able to connect with the terminal (53) so as to have a connection with the filament (102).

Figure 3B:
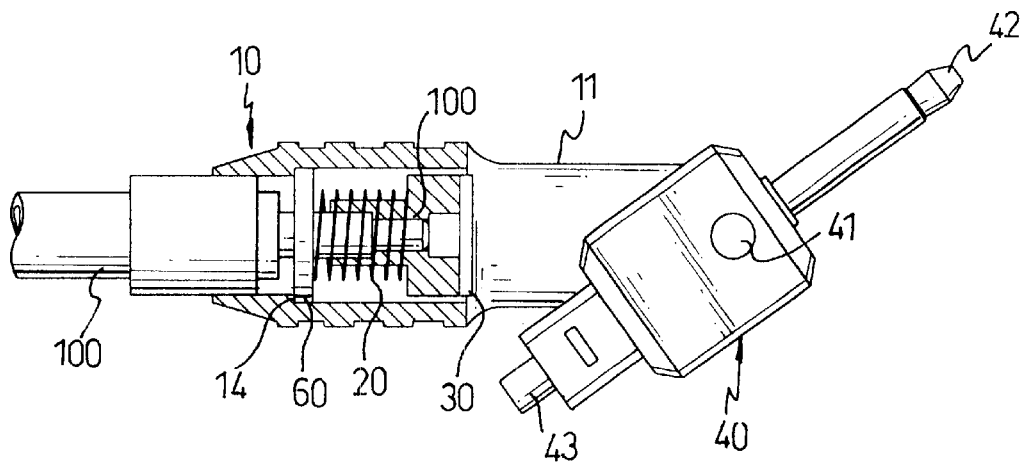
Figure 3C:
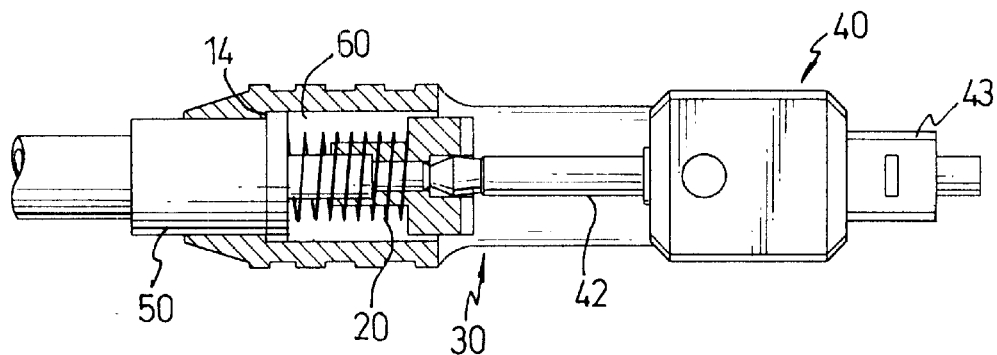

With reference to FIGS. 3A, 3B and 3C, when the first head (42) is required, the user is able to press the engaging member (30) to release the engagement between the terminal (53) and the second head (43), such that the rotation portion (40) is able to rotate relative to the body (10). When the first head (42) aligns with the central passage (31), the user releases the engaging member (30) to allow the engaging member (30) to return to its original position. After the engaging member (30) returns to its original position, the first head (42) engages with the terminal (53) to complete the change of heads (42,43).

With this arrangement, the user is able to readily change one head from the other, such that the user will not have the trouble finding the right head when assembling an acoustic device such as MDs, CD players.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A convertible fiber optic plug comprising:
   a hollow body having an fiber-optic filament movably received therein;
   a rotation portion rotatably engaged with the body and having a first head and a second head oppositely formed with respect to the first head and each of the first head and the second being selectively connected with the filament.

2. The convertible fiber optic plug as claimed in claim 1, wherein the hollow body has a pair of oppositely formed extensions to have the rotation portion rotatably clamped therebetween.

3. The plug as claimed in claim 2, wherein each of the extensions has a through hole and the rotation portion has a pair of oppositely formed protrusions each corresponding to one of the through holes of the extensions so that each protrusion is able to be received in the corresponding through hole to allow the rotation portion to be convertible relative to the body.

4. The plug as claimed in claim 3 further comprising
   a connection seat movably received in the body and provided with a centrally defined path to allow the extension of the filament, a terminal formed on a front end of the connection seat and a hole laterally defined to communicate with the path; and
   a clamping plate corresponding to the hole of the connection seat and having an opening defined to allow the filament to extend through the opening and to secure the filament after the extension of the filament through the opening.

5. The plug as claimed in claim 4, wherein a shoulder is formed on an inner face defining the hollow body and a stop having a through opening is provided to abut the shoulder to limit the movement of the connection seat after the connection seat is received in the hollow body.

6. The plug as claimed in claim 5, wherein a resilient member is provided to mount around the terminal and a distal end of the resilient member abuts the stop.

7. The plug as claimed in claim 4, wherein a resilient member is provided to mount around the terminal and a distal end of the resilient member abuts the stop.

8. The plug as claimed in claim 1 further comprising
   a connection seat movably received in the body and provided with a centrally defined path to allow the extension of the filament, a terminal formed on a front end of the connection seat and a hole laterally defined to communicate with the path; and
   a clamping plate corresponding to the hole of the connection seat and having an opening defined to allow the filament to extend through the opening and to secure the filament after the extension of the filament through the opening.

9. The plug as claimed in claim 8, wherein a shoulder is formed on an inner face defining the hollow body and a stop having a through opening is provided to abut the shoulder to limit the movement of the connection seat after the connection seat is received in the hollow body.

10. The plug as claimed in claim 9, wherein a resilient member is provided to mount around the terminal and a distal end of the resilient member abuts the stop.

11. The plug as claimed in claim 9, wherein an engaging member is provided to have a central passage defined to securely receive the terminal of the connection seat and to clamp the resilient member together with the stop.

12. The plug as claimed in claim 11, wherein the engaging member has a recess defined to communicate with the central passage to allow an accommodation of the first head and the second head of the rotation portion.

13. The plug as claimed in claim 8, wherein a resilient member is provided to mount around the terminal and a distal end of the resilient member abuts the stop.

14. The plug as claimed in claim 8 further comprising an engaging member having a central passage defined to securely receive the terminal of the connection seat.

15. The plug as claimed in claim 14, wherein the engaging member has a recess defined to communicate with the central passage to allow an accommodation of the first head and the second head of the rotation portion.

* * * * *